US012581583B2

(12) United States Patent
Filippov et al.

(10) Patent No.: US 12,581,583 B2
(45) Date of Patent: Mar. 17, 2026

(54) SMART UTILIZATION OF DATA CENTER ILLUMINATION DEVICES

(71) Applicant: Cisco Technology, Inc., San Jose, CA (US)

(72) Inventors: Valentin Filippov, Maple (CA); Elena Gribanova, Dublin, CA (US); Jenita John, Mississauga (CA); David C. White, St. Petersburg, FL (US); Rasika Anil Chaudhari, Seattle, WA (US)

(73) Assignee: Cisco Technology, Inc., San Jose, CA (US)

( * ) Notice: Subject to any disclaimer, the term of this patent is extended or adjusted under 35 U.S.C. 154(b) by 286 days.

(21) Appl. No.: 18/529,291

(22) Filed: Dec. 5, 2023

(65) Prior Publication Data

US 2025/0185145 A1     Jun. 5, 2025

(51) Int. Cl.
| | |
|---|---|
| *H05B 47/175* | (2020.01) |
| *G06F 21/62* | (2013.01) |
| *H04L 12/10* | (2006.01) |
| *H05B 47/115* | (2020.01) |

(52) U.S. Cl.
CPC ....... H05B 47/175 (2020.01); G06F 21/6218 (2013.01); H04L 12/10 (2013.01); H05B 47/115 (2020.01)

(58) Field of Classification Search
None
See application file for complete search history.

(56) References Cited

U.S. PATENT DOCUMENTS

| | | | | |
|---|---|---|---|---|
| 9,864,669 | B1 * | 1/2018 | Klein | G06F 11/3006 |
| 11,722,332 | B2 * | 8/2023 | Barna | H05B 47/1995 |
| | | | | 315/129 |
| 12,210,454 | B1 * | 1/2025 | Bhat | G06F 21/6218 |
| 2010/0295473 | A1 | 11/2010 | Chemel et al. | |
| 2013/0026942 | A1 * | 1/2013 | Ryan | H05B 47/195 |
| | | | | 315/224 |
| 2016/0165659 | A1 | 6/2016 | Deng et al. | |
| 2016/0301575 | A1 * | 10/2016 | Jau | H04L 41/0869 |
| 2017/0302653 | A1 * | 10/2017 | Ortner | H04L 63/0435 |
| 2018/0027630 | A1 * | 1/2018 | DeJonge | H05B 45/10 |
| | | | | 315/86 |

(Continued)

*Primary Examiner* — Wilson Lee
(74) *Attorney, Agent, or Firm* — Rutan & Tucker, LLP; Ravi Mohan; Marc A. McClain

(57) ABSTRACT
Devices, systems, methods, and processes for operating illumination devices on network devices are described herein. Illumination devices, such as light-emitting diodes, on network devices can provide useful status information when being observed by a technician. However, these illumination devices are often not being looked at in large data centers. As such, energy is often wasted on powering these illumination devices. In order to avoid this wasted power usage and increase sustainability, various embodiments described herein turn off illumination devices, such as network indicator lights and overhead lights, as a default state and illuminates them in response to a specific need. This need can be in response to a work order as well as to illuminate a path form an access point of the server room to the target network device that requires work by the network technician. Dynamically engaging illumination devices associated with network devices can reduce overall power usage.

20 Claims, 11 Drawing Sheets

(56)     References Cited

U.S. PATENT DOCUMENTS

| | | | |
|---|---|---|---|
| 2018/0096593 A1* | 4/2018 | Davis | G06F 1/3287 |
| 2019/0391980 A1* | 12/2019 | Mundar | G06F 9/50 |
| 2020/0053858 A1 | 2/2020 | Harbers | |
| 2021/0377240 A1* | 12/2021 | Beemer | H04L 63/105 |

* cited by examiner

600

DISENGAGE POWER FROM ILLUMINATION DEVICES ⁓ 610

RECEIVE A REQUEST FOR ACCESS ⁓ 620

PARSE THE ACCESS REQUEST FOR AT LEAST ONE TARGET NETWORK DEVICE ⁓ 630

DETERMINE A PLURALITY OF ILLUMINATION DEVICES ASSOCIATED WITH THE AT LEAST ONE TARGET NETWORK DEVICE ⁓ 640

ENGAGE THE POWER OF AN ILLUMINATION DEVICE ASSOCIATED WITH THE TARGET NETWORK DEVICE ⁓ 650

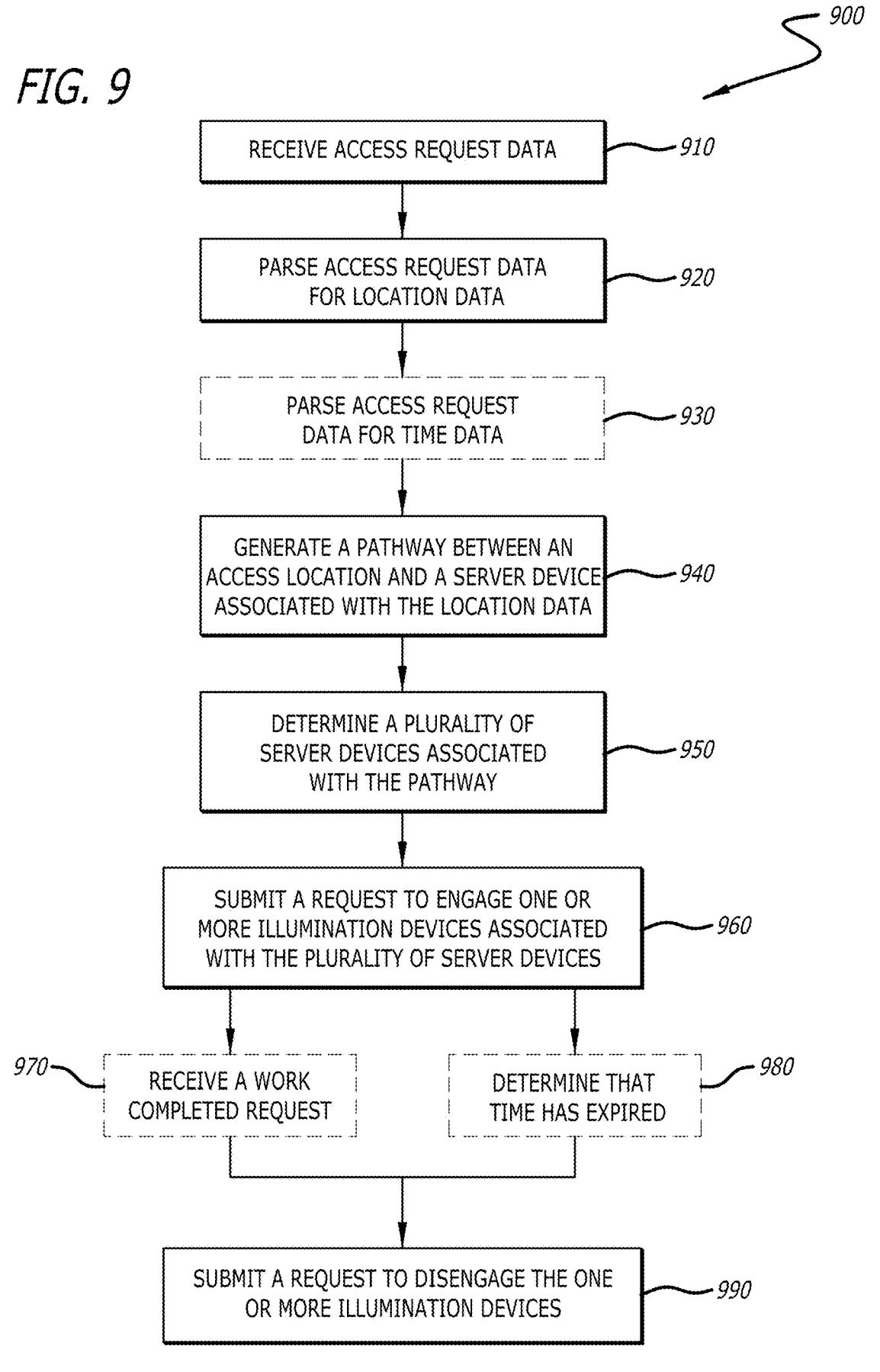

RECEIVE ACCESS REQUEST DATA — 910

PARSE ACCESS REQUEST DATA FOR LOCATION DATA — 920

PARSE ACCESS REQUEST DATA FOR TIME DATA — 930

GENERATE A PATHWAY BETWEEN AN ACCESS LOCATION AND A SERVER DEVICE ASSOCIATED WITH THE LOCATION DATA — 940

DETERMINE A PLURALITY OF SERVER DEVICES ASSOCIATED WITH THE PATHWAY — 950

SUBMIT A REQUEST TO ENGAGE ONE OR MORE ILLUMINATION DEVICES ASSOCIATED WITH THE PLURALITY OF SERVER DEVICES — 960

970 — RECEIVE A WORK COMPLETED REQUEST

DETERMINE THAT TIME HAS EXPIRED — 980

SUBMIT A REQUEST TO DISENGAGE THE ONE OR MORE ILLUMINATION DEVICES — 990

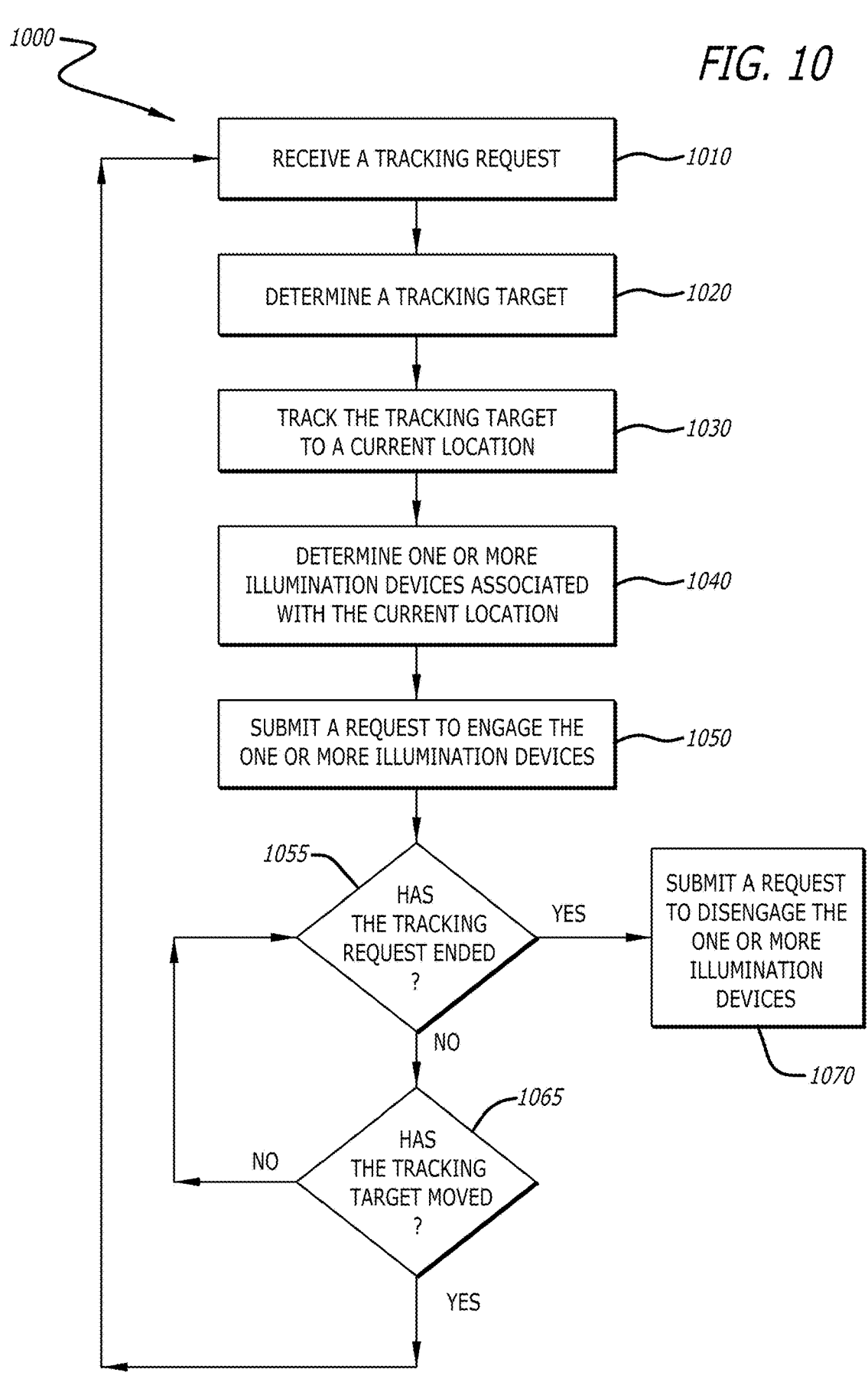

RECEIVE A TRACKING REQUEST — 1010

DETERMINE A TRACKING TARGET — 1020

TRACK THE TRACKING TARGET TO A CURRENT LOCATION — 1030

DETERMINE ONE OR MORE ILLUMINATION DEVICES ASSOCIATED WITH THE CURRENT LOCATION — 1040

SUBMIT A REQUEST TO ENGAGE THE ONE OR MORE ILLUMINATION DEVICES — 1050

1055 — HAS THE TRACKING REQUEST ENDED ?

YES

SUBMIT A REQUEST TO DISENGAGE THE ONE OR MORE ILLUMINATION DEVICES — 1070

NO

HAS THE TRACKING TARGET MOVED ? — 1065

NO

YES

SMART UTILIZATION OF DATA CENTER ILLUMINATION DEVICES

The present disclosure relates to networking. More particularly, the present disclosure relates to operating illumination devices in data centers in a sustainable and smart manner to conserve power and indicate provided access.

BACKGROUND

In various networking deployments, network devices, such as, but not limited to, application servers, web servers, file servers, storage servers, backup servers, and the like are deployed with a plurality of illumination devices. For example, servers and other network devices deployed within rackmount units often have a variety of light-emitting diodes (LEDs) and Liquid Crystal Displays (LCD) that are typically turned on or configured to blink to or show status states. These LEDs and LCDs are also frequently on or at least operational at all times.

Data centers can be arranged with up to thousands of servers and networking devices. These devices can sit within dedicated rooms that operate in isolation without human input. As such, the LEDs or other illumination devices that are operated on each of those devices require power and emit heat. While each illumination device may only consume a small amount of power and generate a small amount of heat, when compounded within deployments such as data centers with thousands or even tens of thousands of network devices, the amount of electricity required to power all the LEDs and LCDs on these devices, and cool the air down from the excess heat created as a byproduct can become costly.

SUMMARY OF THE DISCLOSURE

Systems and methods for de-illuminating all types of light sources from devices in data centers in a sustainable and smart manner to conserve power and indicate provided access in accordance with embodiments of the disclosure are described herein. In some embodiments, a device includes a processor, at least one network interface controller configured to provide access to a network, and a memory communicatively coupled to the processor, wherein the memory includes a smart illumination logic. The logic is configured to determine a plurality of illumination devices within a data center, wherein the plurality of illumination devices allow for remote power configuration, disengage the power of one or more of the plurality of illumination devices, receive access request data, parse the access request data for location data, wherein the location data is associated with at least one target network device, and engage at least one illumination device associated with the at least one target network device.

In some embodiments, the at least one illumination device is an illumination device powered by the at least one target network device.

In some embodiments, the at least one illumination device is a light-emitting diode.

In some embodiments, the at least one illumination device is a liquid crystal display.

In some embodiments, the at least one illumination device is an illumination device in physical proximity to the at least one target network device.

In some embodiments, the at least one illumination device is an overhead light.

In some embodiments, the overhead light is configured to receive power over ethernet (PoE).

In some embodiments, the smart illumination logic is further configured to receive a work completed request, and submit a request to disengage the power of the at least one illumination device associated with the at least one target network device.

In some embodiments, the work completed request is received in response to a security device determining that no person remains in the data center.

In some embodiments, disengaging includes responding to one or more application programming interface requests.

In some embodiments, the smart illumination logic is further configured to parse the access request data for time data, determine a stop time based on the time data, and submit, in response to the stop time elapsing, a request to disengage the power of the at least one illumination device associated with the at least one target network device.

In some embodiments, the smart illumination logic is further configured to generate a pathway between an access location and the at least one target network device, determine a plurality of illumination devices associated with the pathway, and submit a request to engage the power of the plurality of illumination devices.

In some embodiments, access request is received from an access control system.

In some embodiments, the access control system is configured to generate the access request in response to an access device being scanned.

In some embodiments, the access device is a radio frequency identification badge.

In some embodiments, the access device has an associated identification number.

In some embodiments, a device includes a processor, at least one network interface controller configured to provide access to a network, and a memory communicatively coupled to the processor, wherein the memory includes a smart illumination logic. The logic is configured to receive access request data associated with a data center room, parse the access request data for location data, wherein the location data is associated with at least one target network device within the data center room, and engage at least one illumination device associated with the at least one target network device.

In some embodiments, the smart illumination logic is further configured to determine a plurality of illumination devices within a data center room, wherein the plurality of illumination devices allow for remote power configuration, and disengage the power of one or more of the plurality of illumination devices prior to receiving access data.

In some embodiments, the access request data is associated with a work order for one or more network devices within a server room.

In some embodiments, a method of reducing data center power usage includes determining a plurality of illumination devices within a data center, wherein the plurality of illumination devices allow for remote power configuration, disengaging the power of the plurality of illumination devices, receiving access request data, parsing the access request data for location data, wherein the location data is associated with a target network device, and engage the illumination devices associated with the target network device.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The above, and other, aspects, features, and advantages of several embodiments of the present disclosure will be more apparent from the following description as presented in conjunction with the following several figures of the drawings.

FIG. 9 is a flowchart depicting a process for operating a network management system operating with a smart illumination logic in accordance with various embodiments of the disclosure;

FIG. 10 is a flowchart depicting a process for tracking a free-moving network administrator with a smart illumination logic in accordance with various embodiments of the disclosure.

Figure 1:
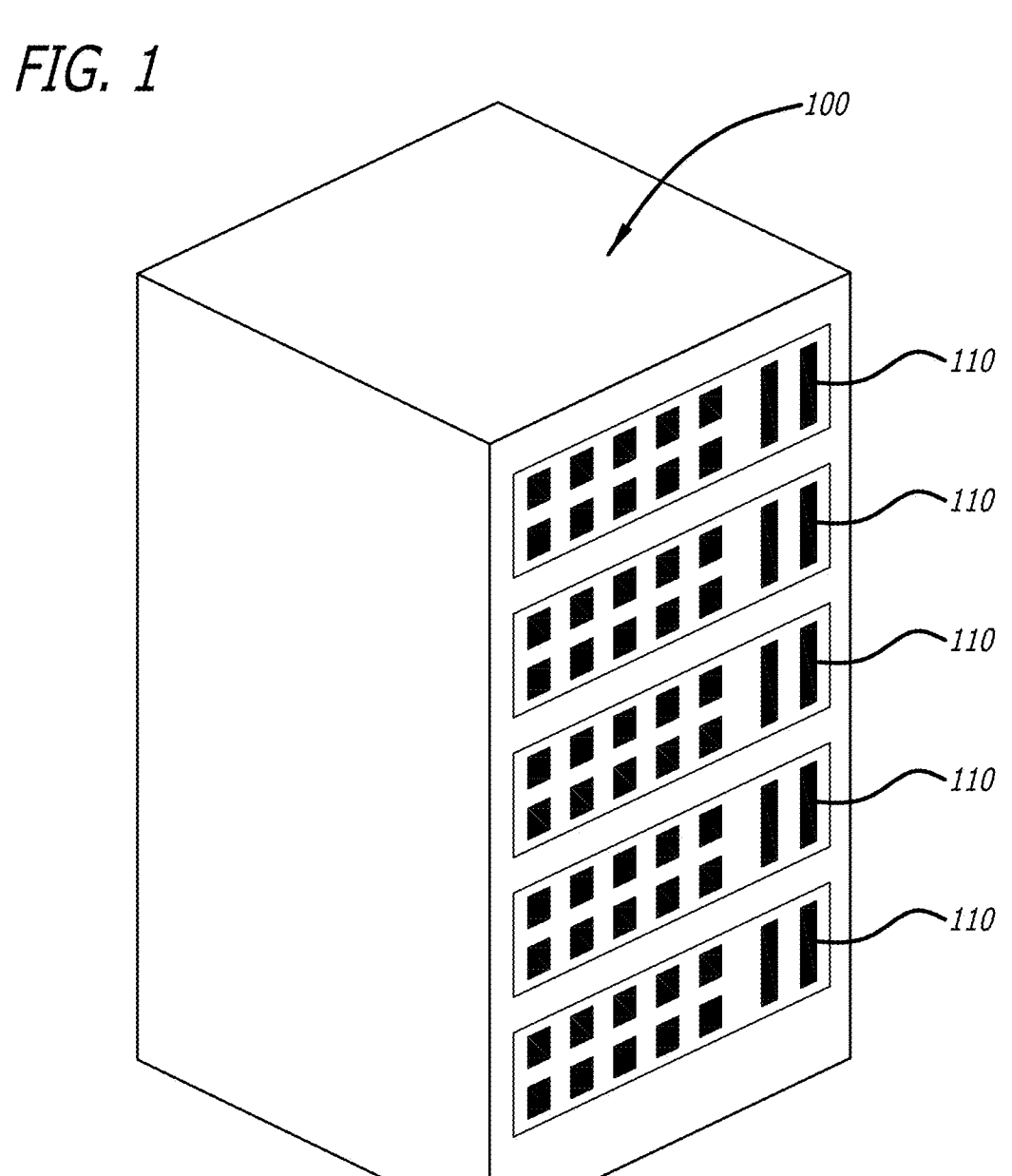
FIG. 1 is a conceptual illustration of a network device with a plurality of illumination devices in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the issues described above, devices and methods are discussed herein that can sustainably and intelligently engage and/or disengage illumination devices within a data center, often those associated with servers and/or other network devices. For example, a data center may have hundred or even thousands of network devices installed, each with a plurality of associated illumination devices, such as light-emitting diodes (LEDs) and Liquid Crystal Displays (LCDs). The LEDs and LCDs are often, by default, always on to indicate some status. However, many data centers only require personnel on site when a work order or other event requires it. During the times no person is in the data center, all of the power required to engage and illuminate the LEDs and other illumination devices on the network devices and servers is wasted.

As those skilled in the art will recognize, references made to server rooms and data centers may be done interchangeably. A server room, or network room, may often be considered a smaller version of a data center. A server room can contain tens to hundreds of devices, whereas a data center generally contains thousands to tens of thousands of devices. It is contemplated that the various embodiments described herein can be applicable to any size scale of devices within a room and/or building.

Likewise, the act of engagement and/or disengagement can vary depending on the application desired. For example, certain illumination devices can be powered through various power sources that are controlled by a switch. The switch can be configured to provide power over one or more lines to the illumination devices. The switch may be configured to engage and/or disengage power to these illumination devices by providing and/or removing the power provided to them. In some embodiments, overhead lights may be configured to be powered by Power over Ethernet (POE), which are connected to a switch. The switch can disengage power from the various overhead lights, causing them to turn off. Conversely, the switch may engage power to the overhead lights, causing them to turn on.

Similarly, network devices may have a plurality of illumination devices associated with them, often as, but not limited to, displays, network indicators, and the like. For these illumination devices, engagement and disengagement can be accomplished through the use of a software-based messaging system. In many embodiments, the network devices can be configured with one or more application programming interfaces (APIs), which can be utilized to remotely engage or disengage an illumination device associated with the network device. For example, a call may be made to the API, which can instruct or otherwise direct the network device to disengage or not illuminate one or more illumination devices. Additionally, the API may be called upon in response to an event (such as those described in more detail below), which can direct the network device to engage or otherwise enable the normal operation of one or more illumination devices. These various engagements and disengagements can be configured to occur over many different network devices at once, as will be described below.

As a result, various embodiments described herein can set a default state of off or lower-power mode for the various data center illumination devices. However, because many server rooms have controlled access, when such access is authorized or otherwise validated, embodiments described herein can issue a command to turn on the illumination devices on a target network device that is subject to the work order event. As a result, the information and/or status provided by the illumination devices is only presented when it is needed.

Furthermore, various embodiments of the smart illumination logic described herein can determine a pathway that the network technician or administrator should take to reach the target network device from a particular access point. By determining this pathway, various engagement signals can be generated and transmitted to network devices and/or remote enabled lighting devices along the pathway. By doing this, an illuminated pathway can be made that can guide the network technician or administrator to the target network device. This can further reduce energy usage and guide workers toward a target and perhaps away from other sensitive areas.

In some embodiments, the person entering the server room can be tracked in a "live" fashion, such as through a wireless device or radio frequency identification (RFID) badge, through one or more wireless access points or cameras, such that the devices directly next to the person are issued signals to engage their illumination devices. Thus, when a person has unlimited access to the server room, their area can be illuminated no matter where they go within the server room. As a result, fewer lights may be needed, such as overhead lights within a server room, unless that increased illumination is needed for the specific task being performed.

A number of the embodiments described herein can be operated on locally within the server room or the data center that houses the server room. However, some embodiments can be configured to operate or otherwise generate decisions or signals in a physically remote location via a cloud-based service such as a network management system or the like. As described in more detail below, there are a variety of different deployment types that can be utilized depending on the application desired or other security-related concerns.

Additionally, it is recognized that the terms "power" and "energy" are often used interchangeably in many colloquial settings but have distinct differences. Specifically, energy is accepted as the capacity of a system or device to do work (such as in kilowatt-hours (kWh)), while power is the rate at which energy is transferred (often in watts (W)). Power represents how fast energy is being used or produced. With this in mind, it should be understood that various elements of the present disclosure may utilize common terms like "power lines," "power grids," power source," "power consumption," and "power plant" when describing energy delivery and utilization, even though those skilled in the art will recognize that those elements are delivering or processing energy (specifically electricity) at a certain rate of power. References to these terms are utilized herein specifically to increase the ease of reading.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a conceptual illustration of a network device 110 with a plurality of illumination devices in accordance with various embodiments of the disclosure is shown. In many embodiments, a network device 110 is configured within a rackmount unit 100. As those skilled in the art will recognize, placing a network device 110 within a rackmount unit 100 provides several advantages for organizations managing IT infrastructure. Rackmount units 100 optimize space utilization, allowing network devices 110 to be stacked efficiently, which is especially valuable in data center environments with limited floor space. The server rackmount unit 100 can promote organization and tidiness by managing cables and accessories neatly. In a number of embodiments, rackmount units 100 can also be configured to aid in cooling, with airflow considerations built into their design, preventing overheating, and ensuring optimal server performance. Enhanced physical security can be achieved through locking doors and panels. Scalability can be simplified, maintenance becomes easier, and redundant power and network options may enhance reliability.

In various embodiments, illumination devices, such as, but not limited to, light emitting diodes (LEDs) or liquid crystal displays (LCDs) on the front of a network device 110 serve crucial roles in providing information to IT administrators and technicians. They offer quick visual feedback on various aspects of the server's status and health. These LEDs or other illumination devices can indicate the device's power status, overall health, drive and network activity, system errors, hot-swap component status, temperature and cooling conditions, front panel lock status, remote management status, and more. Some illumination devices can be configured to provide numeric codes for specific diagnostics or error identification, while others may surround power and reset buttons to indicate their status. These indicators can play a vital role in real-time monitoring, diagnostics, and maintenance, helping IT professionals promptly respond to network device conditions and issues, thus contributing to the overall reliability and manageability of the network infrastructure.

However, data center room design has been trending toward larger rooms of network devices 110 that are not staffed at all times by people such as network technicians or administrators, etc. When no one is in the room to notice or read the illumination devices, the power utilized to make them generate light is wasted. As such, various embodiments of the disclosures as described herein can configure illumination device associated with various network devices 110 to remain in an off or lower-power state until it is needed. Likewise, overhead lights can produce further inefficiencies in energy usage if left on when no one is present. Thus, various illumination devices like those associated with network devices 110, overhead lights, and the like can be configured to allow for remote power configuration. In this way, any of these illumination devices can be remotely engaged or disengaged to turn them on or off.

Although a specific embodiment for a network device 110 with a plurality of illumination devices suitable for management with a movement detection logic in accordance with various embodiments of the disclosure is discussed with respect to FIG. 1, any of a variety of systems and/or processes may be utilized in accordance with embodiments of the disclosure. For example, the network device 110 may be configured in any way, which can include not being disposed within a rackmount unit 100. Indeed, any configuration of network devices may be utilized. The elements depicted in FIG. 1 may also be interchangeable with other elements of FIGS. 2-11 as required to realize a particularly desired embodiment.

Figure 2:
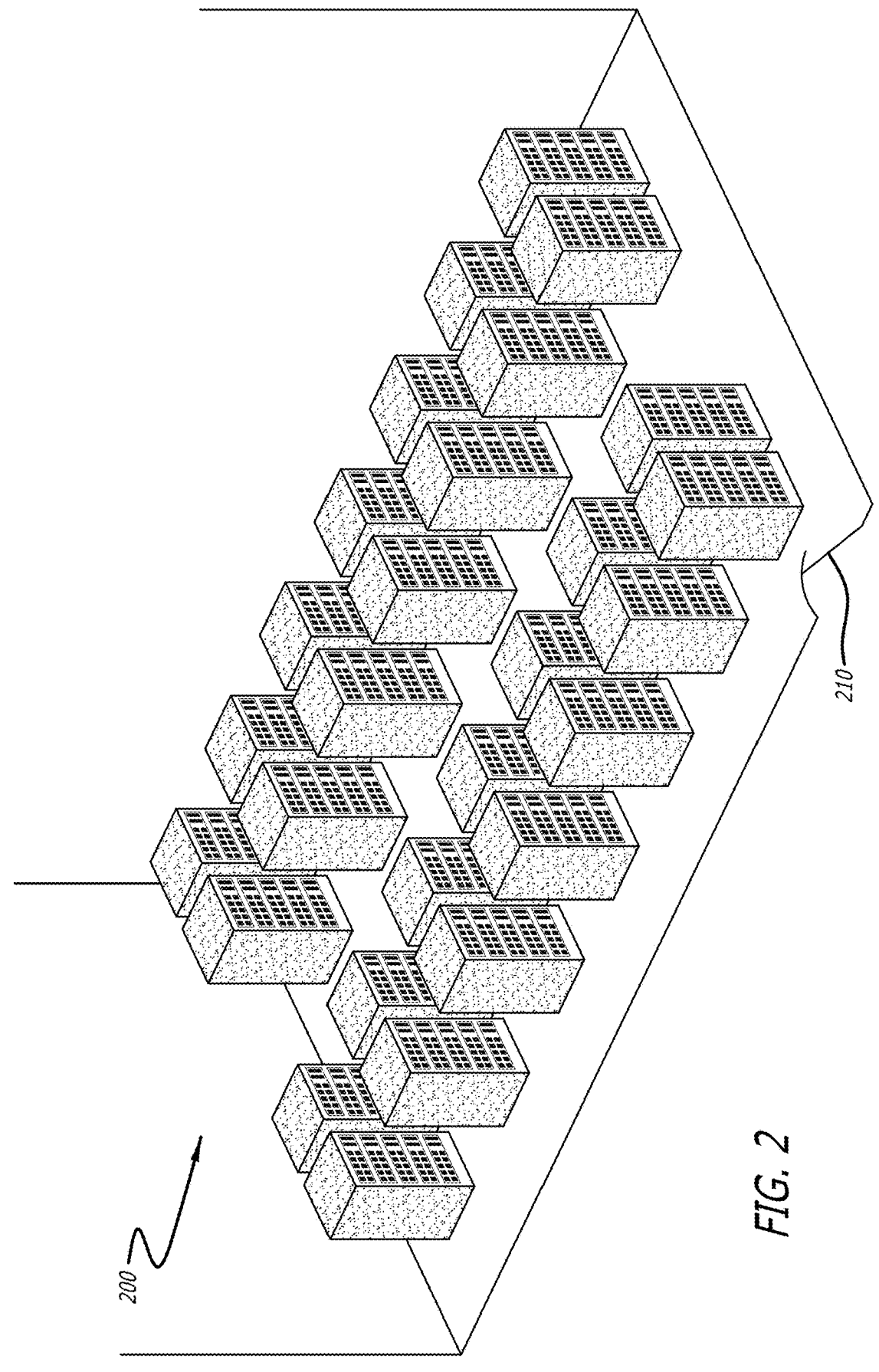
FIG. 2 is a conceptual illustration of a plurality of network devices with corresponding illumination devices turned off in accordance with various embodiments of the disclosure.

Referring to FIG. 2, a conceptual illustration of a plurality of network devices with corresponding illumination devices turned off in accordance with various embodiments of the disclosure is shown. In many embodiments, network devices, such as the network device depicted in FIG. 1, can be configured within a server room 200. The server room can exist within a larger data center. In various embodiments, the server room 200 can have at least one entry point 210. The entry point 210 depicted in the embodiment shown in FIG. 2 is a single door. However, it is contemplated that other entry point may be utilized as needed.

In order to achieve increased energy efficiency and cost savings, various embodiments of the disclosure described herein can configure the illumination devices disposed on or within the various network devices to be turned off as a default state. In further embodiments, the server room 200 may have a plurality of overhead lights or similar room illumination devices that are configurable for power, such as with power over ethernet (POE). The default state of the server room 200 with illumination devices disengaged from power can correspond to time when no persons, users, or other non-infrared cameras are located within the server room 200. As such, the loss of information that occurs from a lack of illumination devices is not felt. Conversely the power required to power these illumination devices can be saved. Furthermore, for every bit of power transmitted, a portion of that power is transformed into heat, which must be removed from the room by using more power to cool down the ambient room temperature. Therefore, by not illuminating unnecessary lighting you not only save the direct power savings, but the indirect savings of not having to use additional power to cool down the air.

Although a specific embodiment of a plurality of network devices with corresponding illumination devices turned off is described above with respect to FIG. 2, any of a variety of systems and/or processes may be utilized in accordance with embodiments of the disclosure. For example, the server room can be configured to house any number of network devices depending on the application desired. The depiction in FIG. 2 is shown for conceptual ease and is not meant to be limiting to this specific layout. The aspects described in FIG. 2 may also be interchangeable with other elements of FIGS. 1 and 3-11 as required to realize a particularly desired embodiment.

Figure 3:
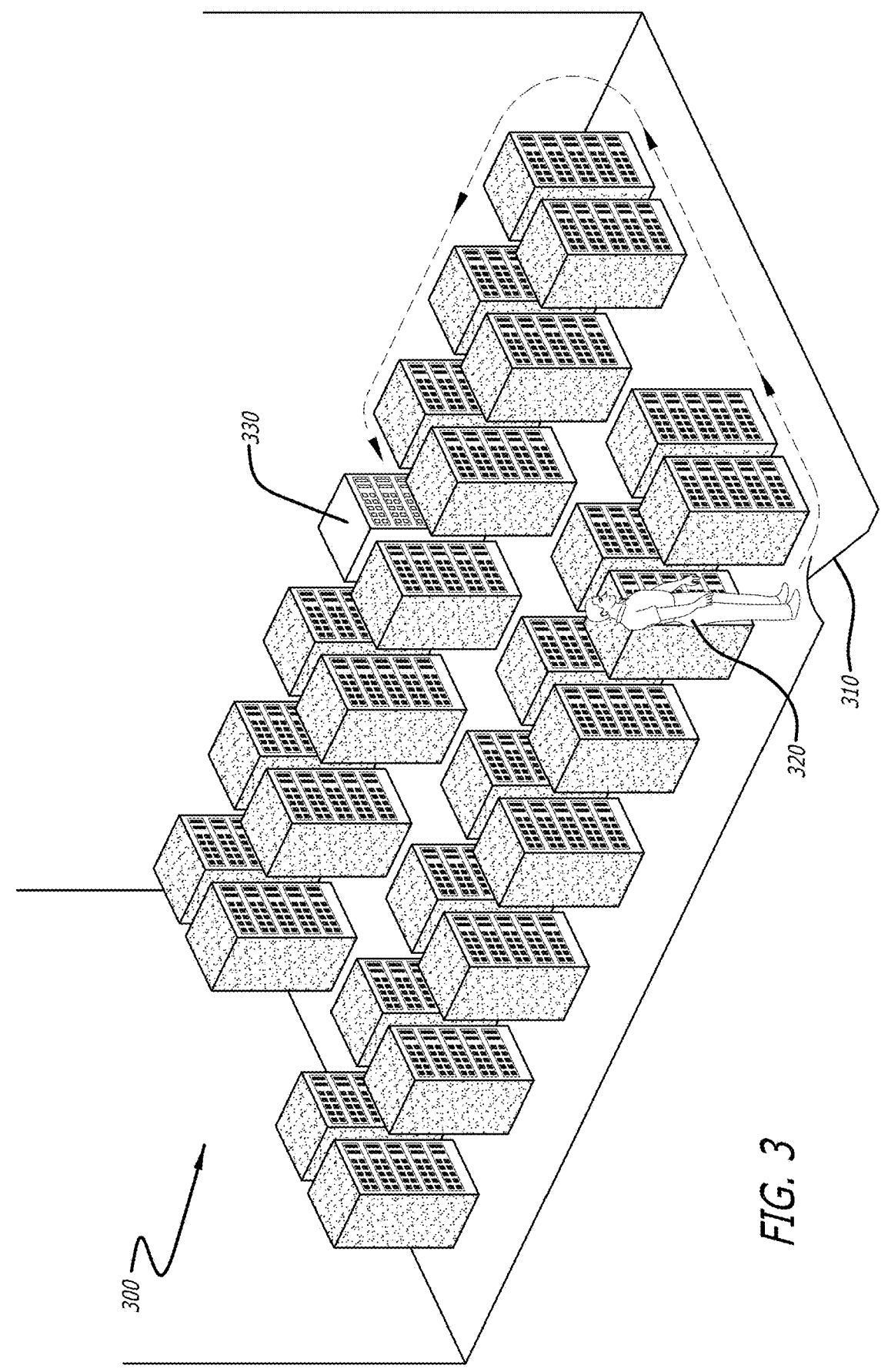
FIG. 3 is a conceptual illustration of a server room with an illuminated target network device in accordance with various embodiments of the disclosure.

Referring to FIG. 3, a conceptual illustration of a server room 300 with an illuminated target network device 330 in accordance with various embodiments of the disclosure is shown. As described above, in many embodiments, a person 320, which may be a technician, network administrator, or the like, can require access to the server room 300 through an entry point 310. This access may be required, for example, to maintain, fix, update, or otherwise interact with one or more network devices. As such, a target network device 330 can be illuminated to indicate to the person 320 where they should go within the server room 300.

In the embodiment depicted in FIG. 3, the person 320 has entered the server room 300 through an access point 310. In this example, the person 320 has been tasked to fix a target network device 330 on the far end of the server room 300. To indicate where the person 320 should go, a plurality of illumination devices can be engaged to highlight the target network device 330. In many embodiments, the target network device 330 can be configured to operate in a traditional fashion with any associated illumination devices engaged and operating normally. In some embodiments, the target network device 330 may be configured to engage all of their associated illumination devices. In additional embodiments, the overhead lights may be engaged over the target network device 330. Indeed, some embodiments may additionally engage additional overhead lights that is associated with a pathway to the target network device 330.

In the embodiment depicted in FIG. 3, the shaded rackmount units indicate that no illumination devices are currently engaged or otherwise on. The remaining rackmount units (i.e., the target network device 330) can have one or more illumination devices engaged. For example, in a server room with no other sources of light, the illumination of the network devices within a rackmount unit can provide the only source of light which would be a strong indicator of where to traverse within the server room 300. To aid in this guidance, the illumination devices directly disposed on the target network device 330 may be engaged, while in more embodiments, the illumination devices of other network devices within the rackmount unit may also be engaged to aid in guidance, even if only for a limited time upon entry of the person 320 into the server room 300.

Although a specific embodiment for a server room 300 with a pathway illuminated between an access point 310 and a target network device 330 suitable for carrying out the various steps, processes, methods, and operations described herein is discussed with respect to FIG. 3, any of a variety of systems and/or processes may be utilized in accordance with embodiments of the disclosure. For example, as discussed in more detail in the description of FIG. 9, a pathway may be determined between the access point 310 and the target network device 330 and illuminate one or more illumination devices associated with the path, such as overhead lights, or the like. The elements depicted in FIG. 3 may also be interchangeable with other elements of FIGS. 1-2, and 4-11 as required to realize a particularly desired embodiment.

Figure 4:
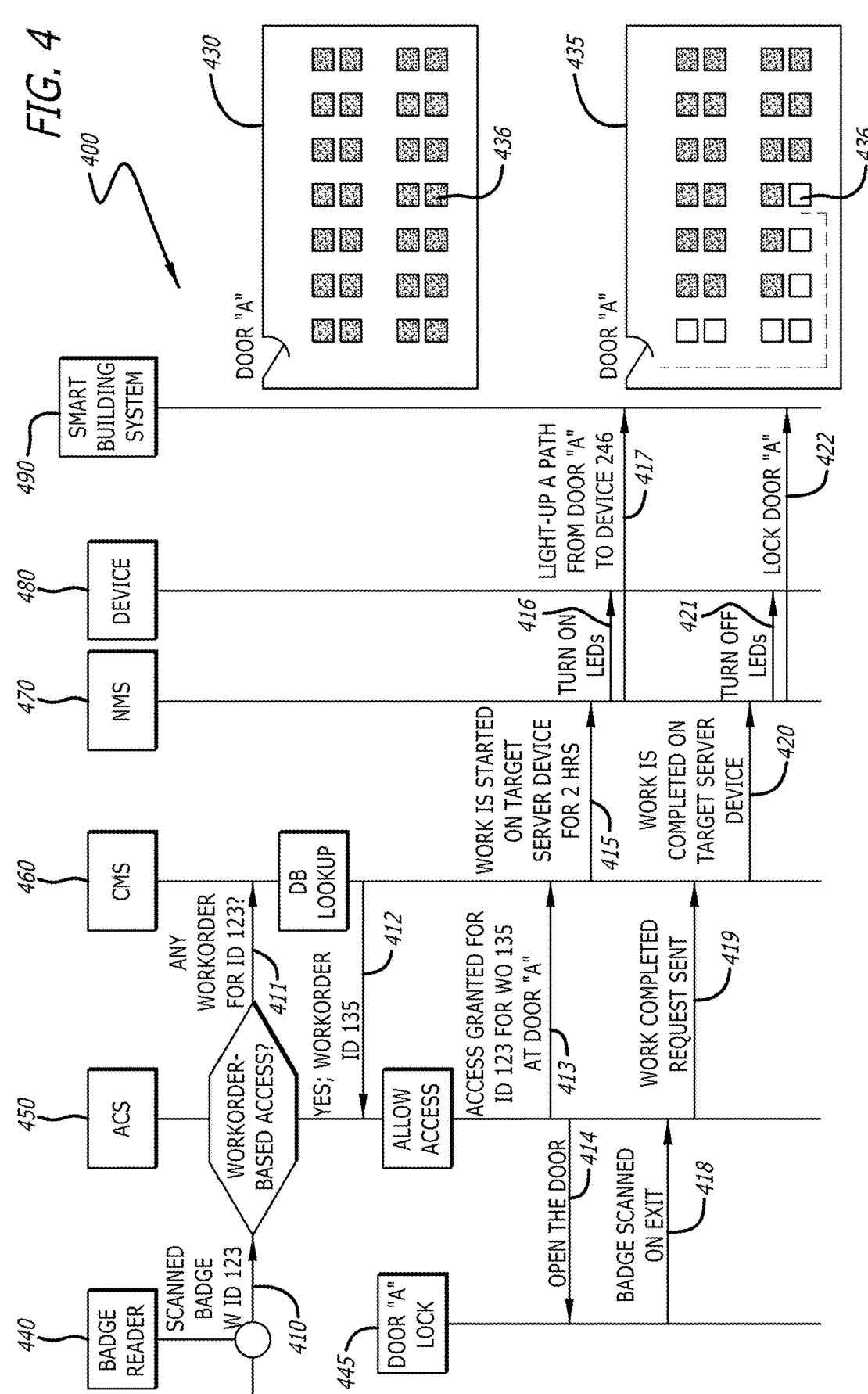
FIG. 4 is a conceptual timing diagram depicting a process for illuminating at least one illumination device within a plurality of network devices in response to an access request in accordance with various embodiments of the disclosure.

Referring to FIG. 4, a conceptual timing diagram 400 depicting a process for illuminating at least one illumination device within a plurality of network devices in response to an access request in accordance with various embodiments of the disclosure is shown. In some embodiments, the system can include a badge reader 440, access control system (shown as ACS 450), centralized management system (shown as CMS 460), network management system (shown as NMS 470), device 480, and smart building system 490. These components can be in communication in various fashion with a server room 430, with a target network device 436. The server room 430 can include a door lock 445 that can prevent access to unauthorized individuals.

It should be understood that the embodiment depicted in FIG. 4 is one of a plurality of different embodiments that can occur. This specific embodiment is provided for illustrative purposes, but is not intended to be limiting to this specific configuration. For example, a person, such as a technician or network administrator may present a badge to the badge reader 440. The badge reader 440 can generate an access request signal 410 which is formatted to indicate that a badge was scanned with an identification number of "123". This access request signal 410 can be sent to the ACS 450. In the embodiment shown in FIG. 4, the ACS 450 processes the received access request signal 410 to determine if the access request is a workorder based access by passing a workorder verification request 411 to the CMS 460. As those skilled in the art will recognize, the security device configured to allow access can be considered may be considered the ACS 450, CMS 460, or even the badge reader 440, depending on what component is processing the signal and/or data sufficiently determine if access should be granted. The specific determination can vary depending on the specific deployment.

In response to receiving a workorder verification request 411, the CMS 460 can parse and enter that data into a database as a database lookup. The database can include a list of authorized access parameters such as persons, work orders, accessible times, etc. If the entered data is found, or otherwise yields a positive output, the CMS 460 may return a validated request signal 412 to the ACS 450. Specifically in the embodiment of FIG. 4, the workorder verification request 411 is configured to validate if a work order exists for identification number "123", and the database lookup (shown as DB lookup) generates the validated request signal 412 indicating that there does exist a work order number "135" is present and associated with identification number "123".

Upon receiving a validated request signal 412, the ACS 450 begin or otherwise issue an access allowance. This can begin a process including transmitting an access signal 414 to an access point such as door "A" lock 445. Additionally, the ACS 450 can also transmit an access granted signal 413 to the CMS 460 which can then subsequently trigger a work started signal 415 to the NMS 470. In the embodiment depicted in FIG. 4, the ACS transmits an access signal 414 to the door "A" lock 445 to unlock that specific access point. This is followed by the ACS 450 transmitting an access granted signal 413 indicating that access will be granted at "door A". In turn, the CMS 460 issues a work started signal 415 indicating that the work order will begin on the target network device 436 for a period of two hours.

In more embodiments, the NMS 470 can transmit an illumination device signal 416 to a plurality of network devices (shown in FIG. 4 as device 480). Subsequently, the NMS 470 may also transmit an illumination signal 417 to the smart building system 490. In the embodiment, depicted in FIG. 4, the illumination signal is described as a "path" such as those discussed in FIG. 9, but may also be an illumination signal to engage illumination devices associated with a target network device 436 as discussed in the embodiment of FIG. 3. In some embodiments, the illumination device signal 416 and the illumination signal 417 can be combined into one signal that can be parsed by a smart illumination logic to select which illumination devices to engage. This may be in the form of a simple static illumination of a target network device 436, an illumination of a pathway, or as part of a live-tracking operation as discussed in FIG. 10. In this way, the illumination device signal 416, illumination signal 417, or the like, can include the entry point, target network device 436, and/or additional data sufficient to generate a command to illuminate a plurality of illumination devices by engaging these illumination devices on the networked ceiling lights or associated areas.

In the embodiment depicted in FIG. 4, the server room 430 is in a default state of having no illumination devices engaged. However, upon receiving the illumination signal 417, the smart building system 490 can, through a smart illumination logic or other such means, engage a plurality of illumination devices on the networked devices, which is shown in the illuminated server room 435. In the embodiment shown in FIG. 4, the areas next to a pathway between the door "A" entry point and the target network device 436 have at least one illumination device engaged. However, in many embodiments, the illuminated server room 435 may simply have one or more illumination devices engaged proximate to the target network device 436 only.

Eventually, the technician will complete the work order and leave the server room 435. In some embodiments, the person will scan their badge on the way out of the server room 435 which can trigger a second access signal 418 from the door "A" lock 445 to the ACS 450 indicating that their badge was scanned as they exited. The ACS 450 may subsequently generate a work complete request signal 419 to the CMS 460. In response, the CMS 460 can issue a work completed signal 420 to the NMS 470. IN the embodiment depicted in FIG. 4, the CMS is indicating that the work on the target network device 436 is completed.

As a result, the NMS 470 can issue a lights off command 421 to the device 480 (or each device that was previously illuminated), as well as an access point secure signal 422 to the smart building system 490. Specifically in FIG. 4, the NMS 470 is indicating to the smart building system 490 that the door "A" lock should be locked. This may be followed by a signal (not shown) from the smart building system 490 to the door "A" lock 445 to engage the lock. The network devices that were illuminated in the server room 435 are signaled by the lights off command 421 to disengage, turn off, or otherwise reduce the power of the previously selected illumination devices.

Although a specific embodiment for a process for illuminating at least one illumination device within a plurality of network devices in response to an access request suitable for carrying out the various steps, processes, methods, and operations described herein is discussed with respect to FIG. 4, any of a variety of systems and/or processes may be utilized in accordance with embodiments of the disclosure. For example, the steps, signals, and devices portrayed in the embodiment of FIG. 4 may be combined entirely, partially, or otherwise. This can often be carried out by a smart illumination logic that can operate within one or more devices on the premises housing the server room 430, but may also be operated remotely, as discussed in more detail below in FIG. 5. The elements depicted in FIG. 4 may also be interchangeable with other elements of FIGS. 1-3 and 5-11 as required to realize a particularly desired embodiment.

Figure 5:
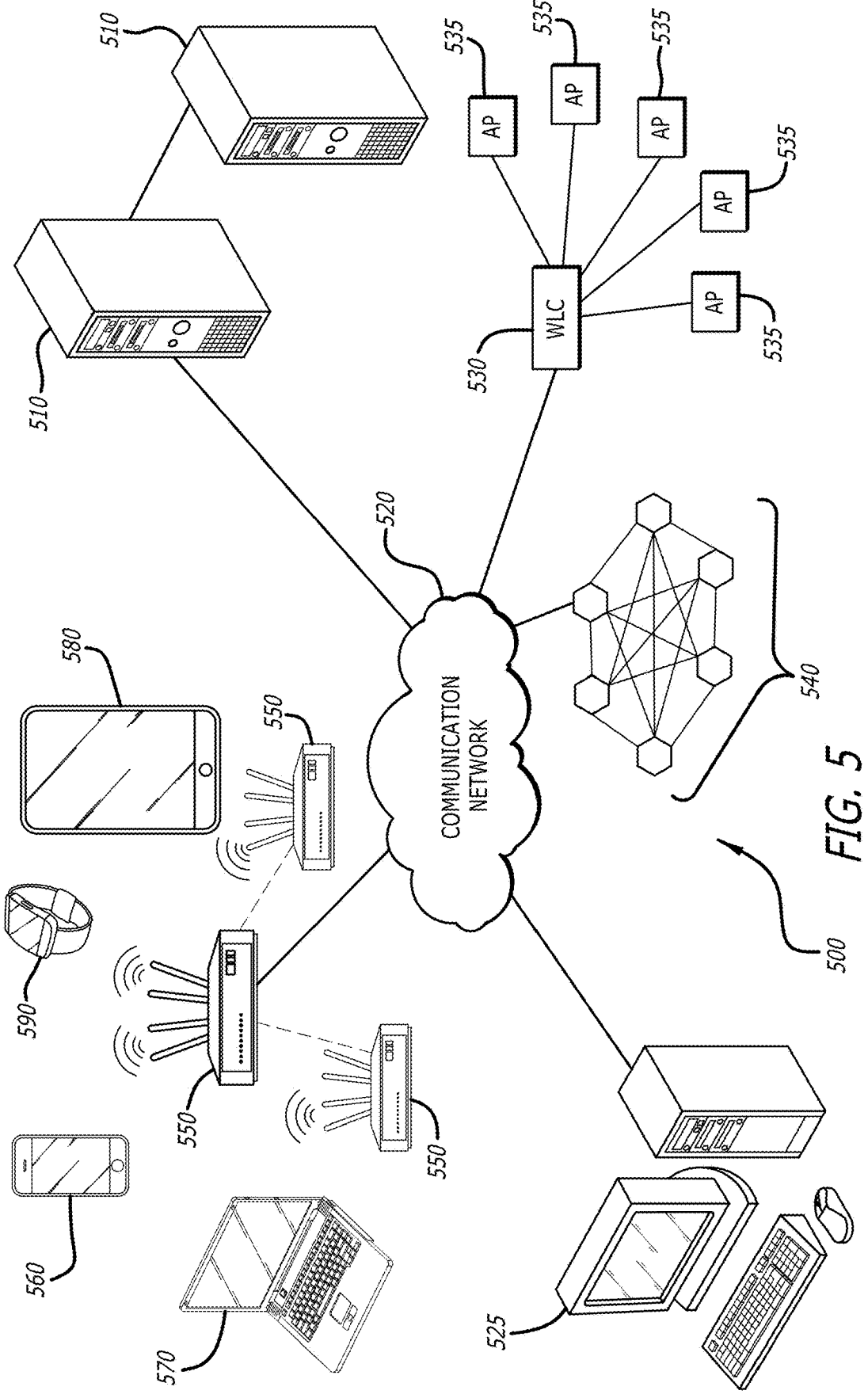
FIG. 5 is a conceptual illustration depicting a variety of deployment arrangements for a smart illumination logic in accordance with various embodiments of the disclosure.

Referring to FIG. 5, a conceptual illustration depicting a variety of deployment arrangements for a smart illumination logic in accordance with various embodiments of the disclosure is shown. Those skilled in the art will recognize that a smart illumination logic can be comprised of various hardware and/or software deployments and can be configured in a variety of ways. In some non-limiting examples, the smart illumination logic can be configured as a standalone device, exist as a logic within another network device, be distributed among various network devices operating in tandem, or remotely operated as part of a cloud-based network management system.

In many embodiments, the network 500 may comprise a plurality of devices that are configured to transmit and receive data for a plurality of network devices, such as servers, etc. In various embodiments, cloud-based centralized management servers 510 are connected to a wide-area network such as, for example, the Internet or a localized network deployment (shown as communication network 520). In further embodiments, cloud-based centralized management servers 510 can be configured with or otherwise operate a smart illumination logic. The smart illumination logic can be provided as a cloud-based service that can service remote networks, such as, but not limited to the deployed network 540. In these embodiments, the smart illumination logic can be a logic that receives data from the deployed network 540 and generates predictions, receives access request signal data, and perhaps automates certain decisions or illumination selections associated with the deployed network devices. In certain embodiments, the smart illumination logic can generate historical and/or algorithmic data in various embodiments and transmit that back to one or more network devices within the deployed network 540.

However, in additional embodiments, the smart illumination logic may be operated as distributed logic across multiple network devices. In the embodiment depicted in FIG. 5, a plurality of network access points (APs) 550 can operate as a smart illumination logic in a distributed manner or may have one specific device facilitate the determination of illumination devices to engage and/or disengage and the resulting signaling of those illumination devices. These devices may include but are not limited to mobile computing devices including laptop computers 570, cellular phones 560, portable tablet computers 580 and wearable computing devices 590. In some embodiments, these devices can be utilized by a technician or network administrator to request access to a server room, or to indicate that a job or work order has been completed.

In still further embodiments, the smart illumination logic may be integrated within another network or network device. In the embodiment depicted in FIG. 5, the wireless LAN controller 530 may have an integrated smart illumination logic that it can use to generate pathways, and/or issue illumination device engagement/disengagement requests to network devices and associated illumination devices that it is connected to, either wired or wirelessly. In this way, the APs 535 or other network devices can be configured such that they can read and report various access, tracking, and illumination device engagement signals to the WLC 530. In still more embodiments, a personal computer terminal 525 may be utilized to access and/or manage various aspects of the smart illumination logic, either remotely or within the network itself. In the embodiment depicted in FIG. 5, the personal computer terminal 525 communicates over the communication network 520 and can access the smart illumination logic within the cloud based centralized management servers 510, the network APs 550, or the WLC 530 to modify or otherwise monitor the smart illumination logic.

Although a specific embodiment for various environments that a smart illumination logic operating on a plurality of network devices suitable for carrying out the various steps, processes, methods, and operations described herein is discussed with respect to FIG. 5, any of a variety of systems and/or processes may be utilized in accordance with embodiments of the disclosure. For example, the smart illumination logic may be implemented across a variety of the systems described herein such that alerts or requests can be transmitted remotely either for notification purposes or manual approval for edge cases where validation may not be as easy as matching up entries in a database, or to override the database validation process. The elements depicted in FIG. 5 may also be interchangeable with other elements of FIGS. 1-2, and 4-11 as required to realize a particularly desired embodiment.

Figure 6:
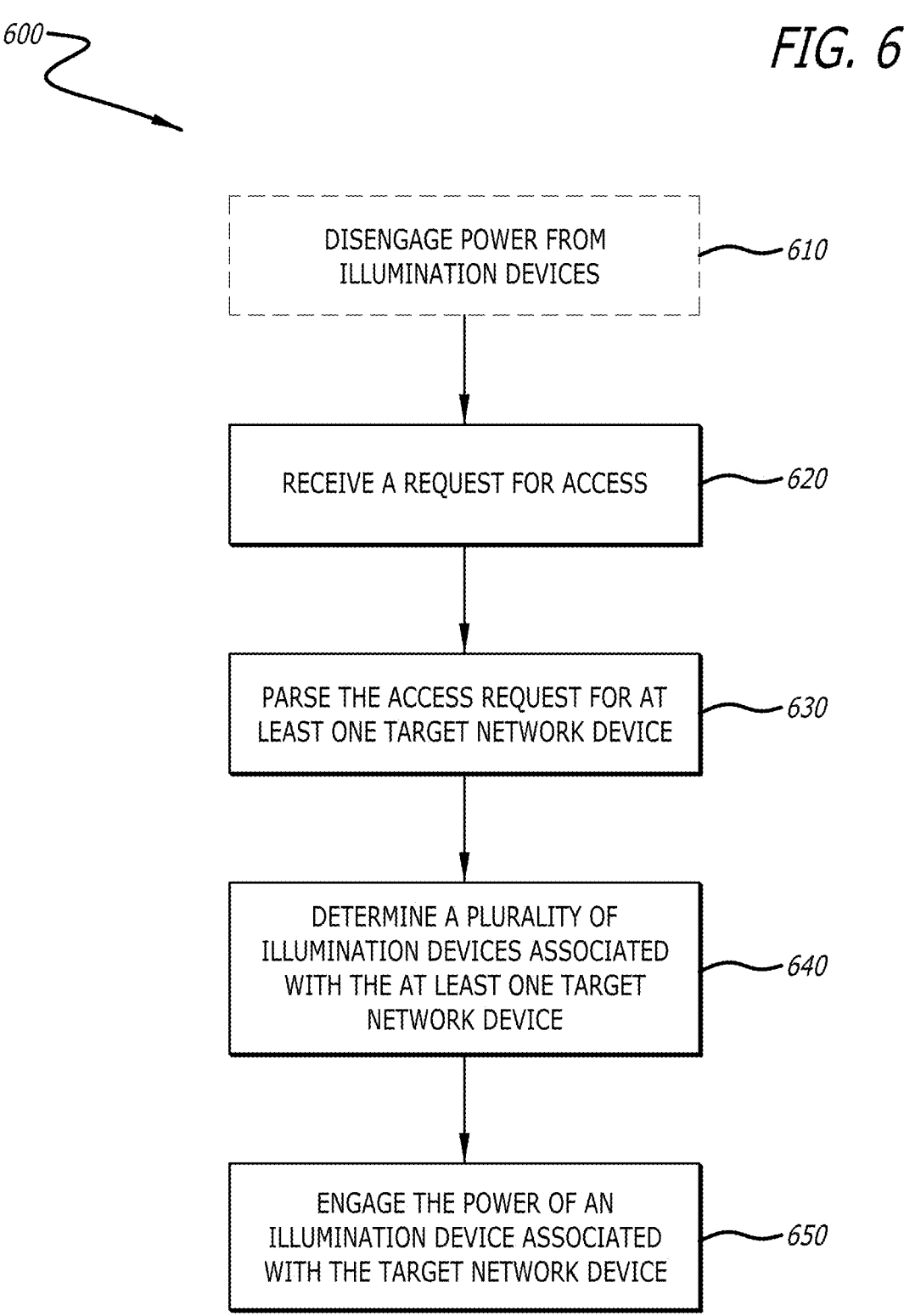
FIG. 6 is a flowchart depicting a process for engaging illumination devices associated with a target network device in accordance with various embodiments of the disclosure.

Referring to FIG. 6, a flowchart depicting a process for engaging illumination devices associated with a target network device in accordance with various embodiments of the disclosure is shown. In certain optional embodiments, the process 600 can disengage power from illumination devices (block 610). Often, when implementing the process 600 to a pre-existing data center or other location that houses network devices, pre-deployed units are traditionally configured to have LEDs or other associated illumination devices that are on at all times. Thus, those LEDs and other illumination devices can be turned off or otherwise disengaged when beginning the process 600. Likewise, certain data centers or server rooms may have a plurality of lighting devices that are configured for remote power configuration which can be disengaged from power as well. As those skilled in the art will recognize, disengaging power may be realized by removing or otherwise disconnecting power delivered to a device, such as via a switch controlling an overhead light. However, in various embodiments, disengaging power can include an instruction sent to a device to disable any associated illumination device.

In many embodiments, the process 600 can receive a request for access (block 620). For example, a technician or network administrator can be tasked with servicing a specific network device within a data center. The data center can have an entry point, such as a door, at one point in a data center room. The location of the target network device can be a determined. In some embodiments, the access request will be made from a different system such as a centralized management system, network management system, access control system, or the like.

In more embodiments, the process 600 can parse the access request for at least one target network device (block 630). Typically, the access request is associated with a work order or some other specific network device that is under evaluation. The process 600 parse the access request by matching a target network device in the access request with a known network device within the server room/data center. Once a match has been made, the process 600 can verify the target network device.

In a number of embodiments, the process 600 can determine a plurality of illumination devices associated with at least one target network device (block 640). As discussed above, each network device or data center server room, can be configured with one or more illumination devices. As those skilled in the art will recognize, illumination devices can vary greatly and be utilized both for visualizing information, but also to help light an area for navigation. These illumination devices can be LEDs, LCD and/or OLED screens, overhead lights, or the like. Indeed, any device or element configured to illuminate light can be considered an illumination device in various embodiments described herein. Certain network devices can be configured with controls such that the illumination devices can be remotely engaged or disengaged from power. The process 600 may poll or otherwise account which illumination devices are present and able to be utilized. The illumination determinations can be made to correspond to the most direct path between an access point and the target network device. Those skilled in the art will recognize that the illumination may be limited to just illumination devices on the target network device, but may also be expanded to illumination devices associated with the work order, and/or areas proximate to the target network device(s), such as other devices within the enclosing rackmount unit, overhead lights, etc.

In a variety of embodiments, the process 600 can engage the power of an illumination device associated with the target network device (block 650). This engagement can be to send a signal to the illumination devices. The signal can originate from various sources, including, but not limited to a centralized management system, network management system, access control system, or the like. The engagement can be for a predetermined period of time, or may remain engaged until a subsequent signal is received indicating that the illumination devices should be turned off.

Although a specific embodiment for engaging illumination devices associated with a pathway suitable for carrying out the various steps, processes, methods, and operations described herein is discussed with respect to FIG. 6, any of a variety of systems and/or processes may be utilized in accordance with embodiments of the disclosure. For example, the process can be coordinated over multiple server rooms, network devices, and access points depending on the application desired. The elements depicted in FIG. 6 may also be interchangeable with other elements of FIGS. 1-5 and 7-11 as required to realize a particularly desired embodiment.

Figure 7:
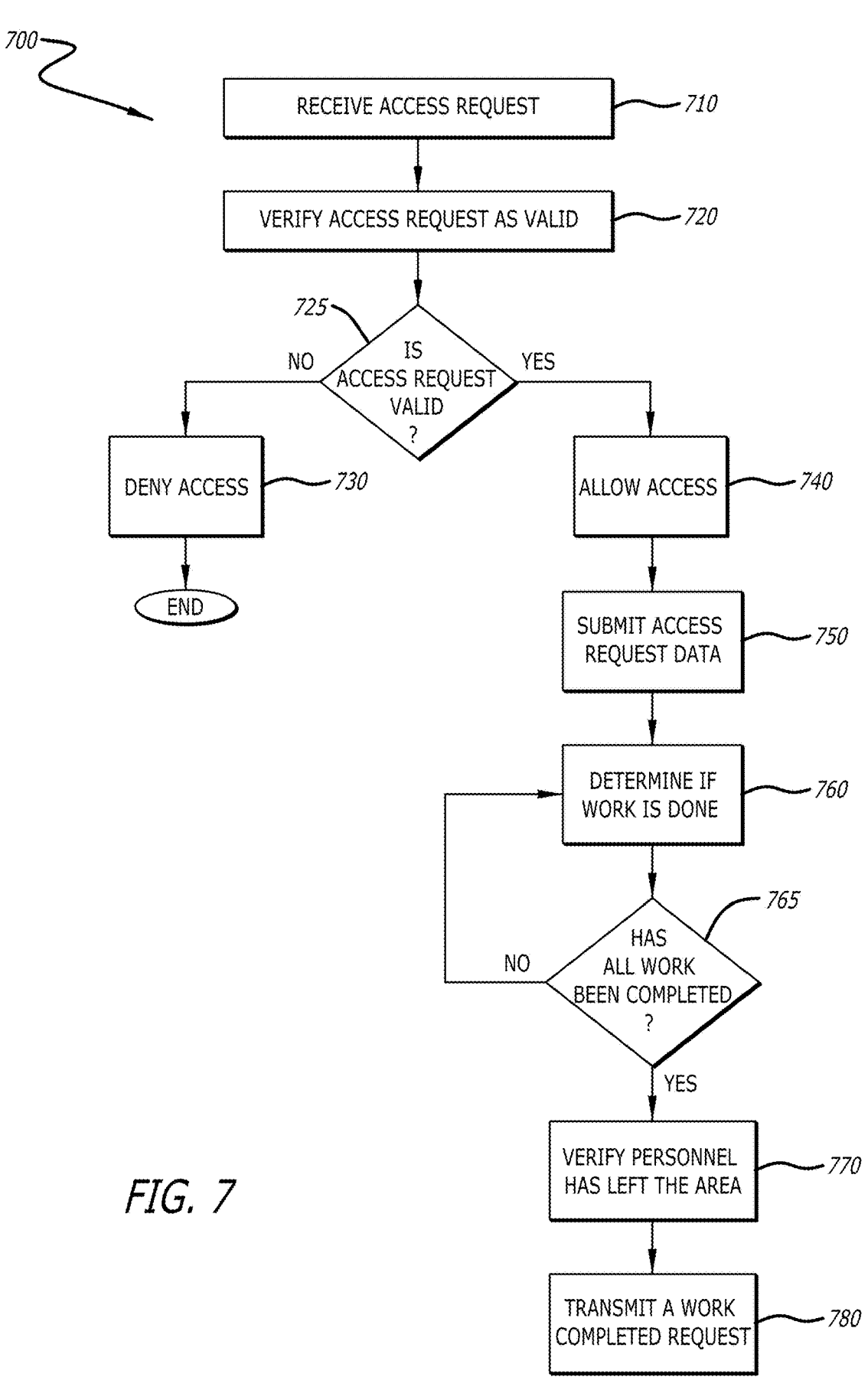
FIG. 7 is a flowchart depicting a process for operating a centralized management system with a smart illumination logic in accordance with various embodiments of the disclosure.

Referring to FIG. 7, a flowchart depicting a process 700 for operating a centralized management system with a smart illumination logic in accordance with various embodiments of the disclosure is shown. In many embodiments, the process 700 can receive an access request (block 710). The access request for allowing physical access can be initiated upon the scanning of an entry badge or other similar physical access device at a data center or server room. In certain embodiments, the time of an access request can be utilized to generate an access request to the process 700 from an external or internal access control system, etc.

In more embodiments, the process 700 can submit access request data (block 720). In certain embodiments, an access control system can determine that an access request was made and generate access request data for submission to a centralized management system for processing. As those skilled in the art will recognize, access requests may include data associated with the person making the request, the time of the request, the location of the request, an associated work order, the target network device, a target data center, or data center room, etc.

In various embodiments, the process 700 can determine if the access request is valid (block 725). In some embodiments, this determination can be done by comparing the access request against a database or other data structure that comprises valid or allowed access requests. Depending on the type of access request provided, the data compared may be related to a work order (is the person here to request access related to a specific work order already known in the system), a specific time (is the person here to perform the work order at the correct day or time), and/or location (is the person requesting access to the correct room containing the target network device), etc. The determination can be done by the centralized management system or other similar logic that has access to the access request data and associated database.

In response to the work order not being valid, the process 700 can end, or remain in the same state and deny access to the request (block 730). However, in response to the work order being validated, the process 700 can allow access (block 740). In certain embodiments, the access can be allowed by sending a signal to a locking device or other entry prohibiting device that it can enter an unlocked or 'access granted' state. In more embodiments, this can be further mirrored by sending a signal to the centralized management system that access was granted.

In a number of embodiments, the process 700 can submit the access request data (block 750). For example, upon validation, the access request data can be forwarded to a network management system or the like. In certain embodiments, the process 700 can incorporate or otherwise add specific data to the access request data to make it suitable for further processing. This data can include items such as the data associated with the person making the request, the time of the request, the location of the request, an associated work order, the target network device, a target data center, or data center room, etc.

In further embodiments, the process 700 can determine if the work has been done (block 760). Often, once access has been granted, certain logics or other systems may not be configured to track the specific activity within the data center. However, upon completion of a work order, a technician or network engineer may notify or enter data into a computer system that can generate and transmit a signal such that the process 700 can be notified of a completed work order. In additional embodiments, the process 700 can determine if work is done by polling, pinging, or otherwise communicating with the target network device. For example, if a server has gone offline, a work order may be determined to be completed upon detection that the server has come back online.

In some embodiments, the process 700 can determine if all of the work has been completed (block 765). This determination can be required when a work order has multiple target network devices, or when access has been granted in relation to multiple work orders. If not all of the work has been done, the process 700 can continue to wait and determine if work has been completed (block 760). However, when it is determined that all work has been completed, the process 700 can, in certain optional embodiments, verify that the personnel, such as, for example, a technician or network engineer, has left the server room or access area (block 770).

In additional embodiments, the process 700 can transmit a work completed request (block 780). For example, a centralized management system can transmit a work completed request to a network management system which can initiate commands to turn off illumination devices within the data center or access area. In more embodiments, the work completed request can indicate the area or work order completed, which can be used to manage which illumination devices are to be turned off and returned to an energy-efficient status.

Although a specific embodiment for operating a centralized management system with a smart illumination logic suitable for carrying out the various steps, processes, methods, and operations described herein is discussed with respect to FIG. 7, any of a variety of systems and/or processes may be utilized in accordance with embodiments of the disclosure. For example, the steps described above can be carried out by a single device and/or logic, but may be managed, at least in part, remotely. The elements depicted in FIG. 7 may also be interchangeable with other elements of FIGS. 1-6 and 8-11 as required to realize a particularly desired embodiment.

Figure 8:
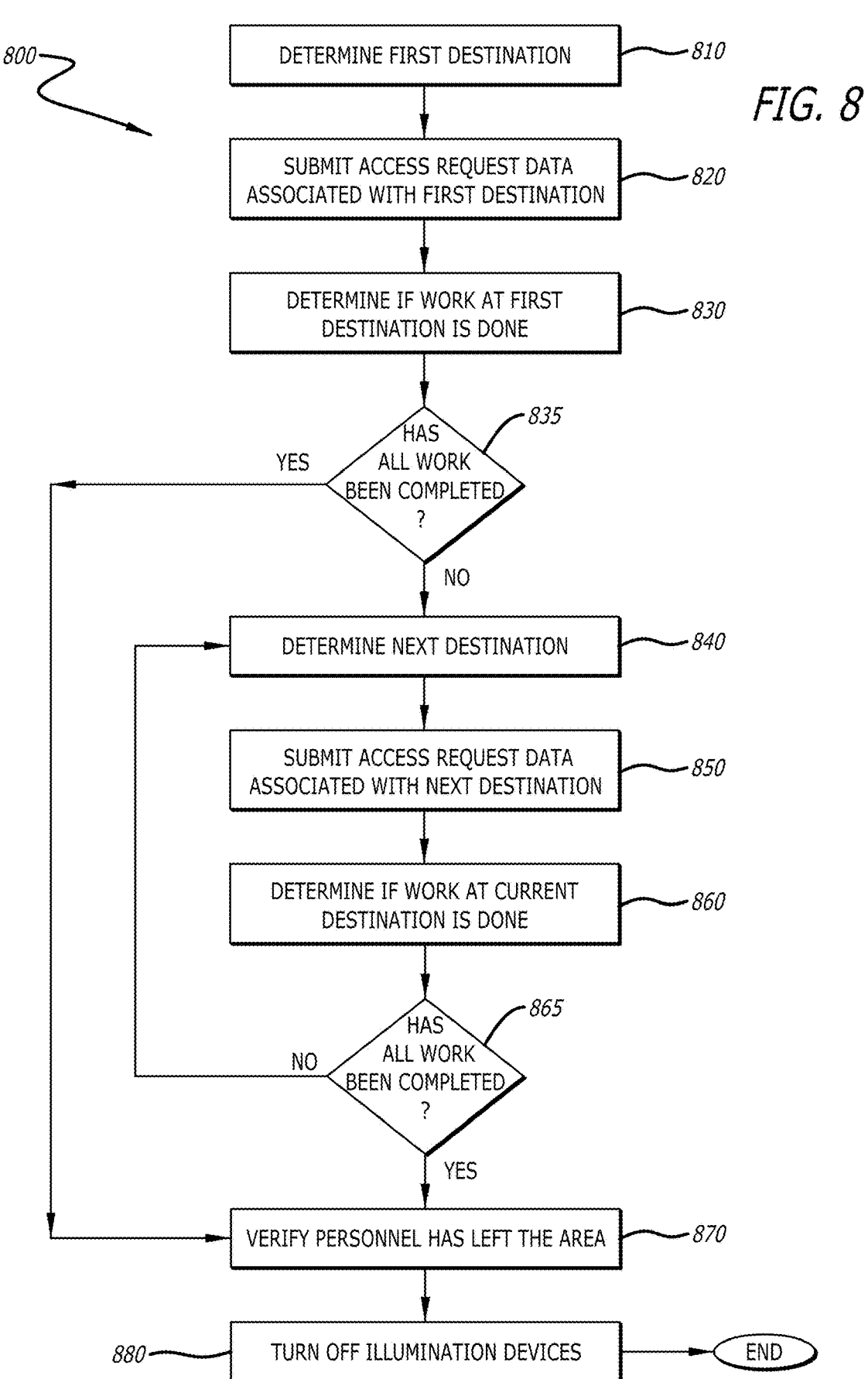
FIG. 8 is a flowchart depicting a process for operating a centralized management system with a smart illumination logic in response to a multi-step work order in accordance with various embodiments of the disclosure.

Referring to FIG. 8, a flowchart depicting a process 800 for operating a centralized management system with a smart illumination logic in response to a multi-step work order in accordance with various embodiments of the disclosure is shown. In many embodiments, the process 800 can determine a first destination (block 810). For example, a data center may have multiple network devices that require a work order. One of those network devices can be selected as a first destination.

In a number of embodiments, the process 800 can submit access request data associated with the first destination (block 820). The access request data can be formatted to be submitted in portions related to each target network device associated with the workorder or series of workorders. In additional embodiments, the access request data associated with the first destination can be formatted to grant access to a particular area, and configure one or more illumination devices to engage in order to illuminate an associated illumination device of the target network device.

In more embodiments, the process 800 can determine if the work at the first destination is complete (block 830). As described above, certain logics or other systems may not be configured to track the specific activity within the data center. However, upon completion of a work order, a technician or network engineer may notify or enter data into a computer system that can generate and transmit a signal such that the process 800 can be notified of a completed work order or a partial completion of the work order. In more embodiments, the process 800 can determine if work is done by polling, pinging, or otherwise communicating with the target network device. For example, if a server has gone offline, a work order may be determined to be completed upon detection that the server has come back online.

In some embodiments, the process 800 can determine if all of the work has been completed (block 835). This determination can be required when a work order has multiple target network devices, or when access has been granted in relation to multiple work orders. If not all of the work has been done, the process 800 can continue to wait and determine if work has been completed (block 830). However, when it is determined that all work has been completed, the process 800 can, in certain embodiments, determine the next destination (block 840).

In various embodiments, the process 800 can submit access request data associated with the next destination (block 850). Similar to the first destination, the access request data can be formatted to be submitted in portions related to each target network device associated with the workorder or series of workorders. In additional embodiments, the access request data associated with the first destination can be formatted to grant access to a particular area, and configure one or more illumination devices to engage in order to illuminate the illumination devices associated with the target network device.

In additional embodiments, the process 800 can determine if work at the current destination is done (block 860). Again, as described above, certain logics or other systems may not be configured to track the specific activity within the data center. However, upon completion of a work order, a technician or network engineer may notify or enter data into a computer system that can generate and transmit a signal such that the process 800 can be notified of a completed work order or a partial completion of the work order. In more embodiments, the process 800 can determine if work is done by polling, pinging, or otherwise communicating with the target network device. For example, if a server has gone offline, a work order may be determined to be completed upon detection that the server has come back online.

In further embodiments, the process 800 can determine if all of the work at this destination has been completed (block 865). This determination can be required when a work order has multiple target network devices, or when access has been granted in relation to multiple work orders. If not all of the work has been done, the process 800 can continue to wait and determine if work has been completed (block 840). However, when it is determined that all work has been completed, the process 800 can, in certain optional embodiments, verify that the personnel has left the area (block 870).

In various embodiments, the process 800 can turn off illumination devices (block 880). This can be achieved in certain embodiments by transmitting, receiving, or otherwise processing a signal, such as a work completed request. In some embodiments, the illumination devices may instead enter a lower-power setting instead of turning off. It is contemplated that, upon completion of the work orders, that the illumination devices will enter an energy-efficiency mode, which may be a lower-power setting, or turning off the illumination devices.

Although a specific embodiment for operating a centralized management system with a smart illumination logic in response to a multi-step work order suitable for carrying out the various steps, processes, methods, and operations described herein is discussed with respect to FIG. 8, any of a variety of systems and/or processes may be utilized in accordance with embodiments of the disclosure. For example, the multi-step process may occur from a single technician or network administrator performing multiple tasks, or may be from multiple people operating within the same data center, server room, or access area. The elements depicted in FIG. 8 may also be interchangeable with other elements of FIGS. 1-7 and 9-11 as required to realize a particularly desired embodiment.

Referring to FIG. 9, a flowchart depicting a process 900 for operating a network management system operating with a smart illumination logic in accordance with various embodiments of the disclosure is shown. In many embodiments, the process 900 can receive access request data (block 910). In various embodiments, the access request data can be received from a centralized management system or the like. The access request data can be generated in response to a request for access to a server room or other access point.

In a number of embodiments, the process 900 can parse access request data for location data (block 920). The access request data can be formatted with various types of data which can be extracted and further processed. In certain embodiments, the access request data can be comprised or otherwise contain location data. Location data can indicate, for example, what access point is being utilized, and what other locations may be associated with the current access request.

In some optional embodiments, the process 900 can parse the access request data for time data (block 930). Time data can include various components such as the time the access is requested, the amount of time a work order is expected to take, a stop time, and/or any delay that should occur before access is granted. In additional embodiments, the time data is provided as additional data and not integrated within the access request data.

In further embodiments, the process 900 can generate a pathway between an access location and a network device associated with the access location (block 940). In many embodiments, the access request data is in relation to a work order or other event that requires a technician, network engineer, or the like to traverse from an access point in a server room to a target network device. The pathway can be generated as a direct route from the access location to the target network device associated with that access location. In additional embodiments, the pathway may be configured to guide away from a specific network device for various reasons including, but not limited to, the network device not having available illumination devices that can be configured to turn on, and/or avoiding passing a high security network device, etc. The pathway can be generated based off of internal map or layout data associated with the server room or other secure location.

In still more embodiments, the process 900 can determine a plurality of network devices associated with the pathway (block 950). As stated above, various pathways may be generated and/or selected from. These pathways may be associated with different network devices. Typically, a network device is associated with a pathway when it is adjacent or otherwise next to the pathway. In this way, these adjacent network devices can be utilized during the process 900.

In a variety of embodiments, the process 900 can submit a request to engage one or more illumination devices associated with the plurality of network devices (block 960). The engagement of the network devices can be in the form of a signal directed to the particular network devices. In some embodiments, the signal can be transmitted individually. In additional embodiments, the signal can be broadcast with various identifiers such that the relevant network devices can receive and process the engagement request. In still more embodiments, the request can be for engagement of only a partial amount of illumination devices associated with each network device, or may be configured to engage a less than full activation, such as half-power or a higher-power mode.

In certain optional embodiments, the process 900 can receive a workload completed request (block 970). This workload completed request can be generated from the technician or the network administrator. For example, upon completion of a work order, the technician or network engineer may notify or enter data into a computer system, tablet, input station, etc. that can be configured to generate and transmit a signal such that the process 900 can take subsequent action. In additional embodiments, the process 900 can determine if work is done by polling, pinging, or otherwise communicating with the target network device. For example, if a server has gone offline, a work order may be determined to be completed upon detection that the server has come back online.

In some additional optional embodiments, the process 900 can determine if an amount of time has expired (block 980). In a number of embodiments, the time is a predetermined amount of time associated with a work order or other activity that is requested upon access request. For example, if a work order is scheduled to take one hour to complete, the process 900 may set a timer to elapse ninety minutes after the access was granted to the area.

In further additional embodiments, the process 900 can submit a request to disengage the one or more illumination devices (block 990). The request can be a result of time elapsing or by the submission of a work completed request. In certain embodiments, the disengagement can be configured to turn off the illumination devices on a plurality of network devices. However, in some embodiments, the disengagement can be configured to direct the illumination devices to enter a lower-power mode.

Although a specific embodiment for operating a network management system operating with a smart illumination logic suitable for carrying out the various steps, processes, methods, and operations described herein is discussed with respect to FIG. 9, any of a variety of systems and/or processes may be utilized in accordance with embodiments of the disclosure. For example, the steps described within the embodiment discussed in FIG. 9 may be carried out by a single logic that also performs steps as described in other figures. Indeed, the elements depicted in FIG. 9 may also be interchangeable and/or combined with other elements of FIGS. 1-8 and 10-11 as required to realize a particularly desired embodiment.

Referring to FIG. 10, a flowchart depicting a process 1000 for tracking a free-moving network administrator with a smart illumination logic in accordance with various embodiments of the disclosure is shown. In many embodiments, the process 1000 can receive a tracking request (block 1010). The tracking request may be configured to track a particular person such as a technician or network administrator. In some embodiments, the tracking request can be received from an identification device located within the area of the server room or other access area.

In a number of embodiments, the process 1000 can determine a tracking target (block 1020). The tracking target may be the technician and/or network administrator that was previously requesting tracking. However, the tracking target may be associated with a specific identification device that is utilized to transmit the tracking request that is to be received.

In more embodiments, the process 1000 can track the tracking target to a current location (block 1030). In certain embodiments, once the tracking target is identified, the process 1000 can locate that tracking target within a specific area. The current location can be precise enough to determine which network devices the tracking target is physically close to. The tracking can be done from a variety of sources including, but not limited to, camera systems with computer vision processing, sensor signals read off of an identification device which can be triangulated or otherwise estimated based on the received signal strength proximate to one or more sensors. It is contemplated that other tracking methods may be utilized to track the location of a tracking target, which may include proximity sensors, etc.

In additional embodiments, the process 1000 can determine one or more illumination devices associated with the current location (block 1040). As described above, the current location can be tracked well enough to determine which network devices are proximate to the tracking target or are otherwise nearby. The determination of illumination devices can be done by identifying what illumination devices are associated with the various network devices nearby the tracking target. However, it is contemplated that illumination devices may exist apart from the network devices and may be associated with a fixture, wall, ceiling, floor, or other surface within a server room or other access area.

In further embodiments, the process 1000 can submit a request to engage the one or more illumination devices (block 1050). The engagement of the illumination devices can be in the form of a signal directed to the particular illumination devices. In some embodiments, the signal can be transmitted individually. In additional embodiments, the signal can be broadcast with various identifiers such that the relevant network devices can receive and process the engagement request. In still more embodiments, the request can be for engagement of only a partial amount of illumination devices associated with each network device, or may be configured to engage a less than full activation, such as half-power or a higher-power mode.

In a variety of embodiments, the process 1000 can determine if tracking request has ended (block 1055). In certain embodiments, this may be determined by the tracking target leaving the area that can be tracked. In additional embodiments, the tracking may be ended after a predetermined amount of time. In more embodiments, the tracking request may be ended in response to the receipt of a work completed request.

If the tracking request has not ended, the process 1000, can further determine if the tracking target has moved (block 1065). Movement of the tracking target can be determined based on a series of tracking target results. The series of results can be utilized to find any change or delta in the determine location and the current location. If no movement is detected, then the process again determines if the tracking request has ended (block 1055). This cycle can continue repeating until either the tracking target has moved, or the tracking request has ended.

However, if the tracking target has moved, then the process 1000 can again track the target to a new current location (block 1030). If the tracking target request has ended, the process 1000 can submit a request to disengage the one or more illumination devices (block 1070). The request can be a result of time elapsing or by the submission of a work completed request. In certain embodiments, the disengagement can be configured to turn off the illumination devices on a plurality of network devices. However, in some embodiments, the disengagement can be configured to direct the illumination devices to enter a lower-power mode. In this way, the tracking target location can be utilized to engage various illumination devices that are nearby a technician or network administrator.

Although a specific embodiment for tracking a free-moving network administrator with a smart illumination logic suitable for carrying out the various steps, processes, methods, and operations described herein is discussed with respect to FIG. 10, any of a variety of systems and/or processes may be utilized in accordance with embodiments of the disclosure. For example, while various embodiments described with respect to FIG. 10 are directed to a network device, centralized management system, or the like, it is contemplated that certain steps, if not all steps, can be completed by a network device coordinating within the deployed network or as a specialized device, similar to the embodiments highlighted in the discussion of FIG. 3 above. The elements depicted in FIG. 10 may also be interchangeable with other elements of FIGS. 1-9 and 11 as required to realize a particularly desired embodiment.

Figure 11:
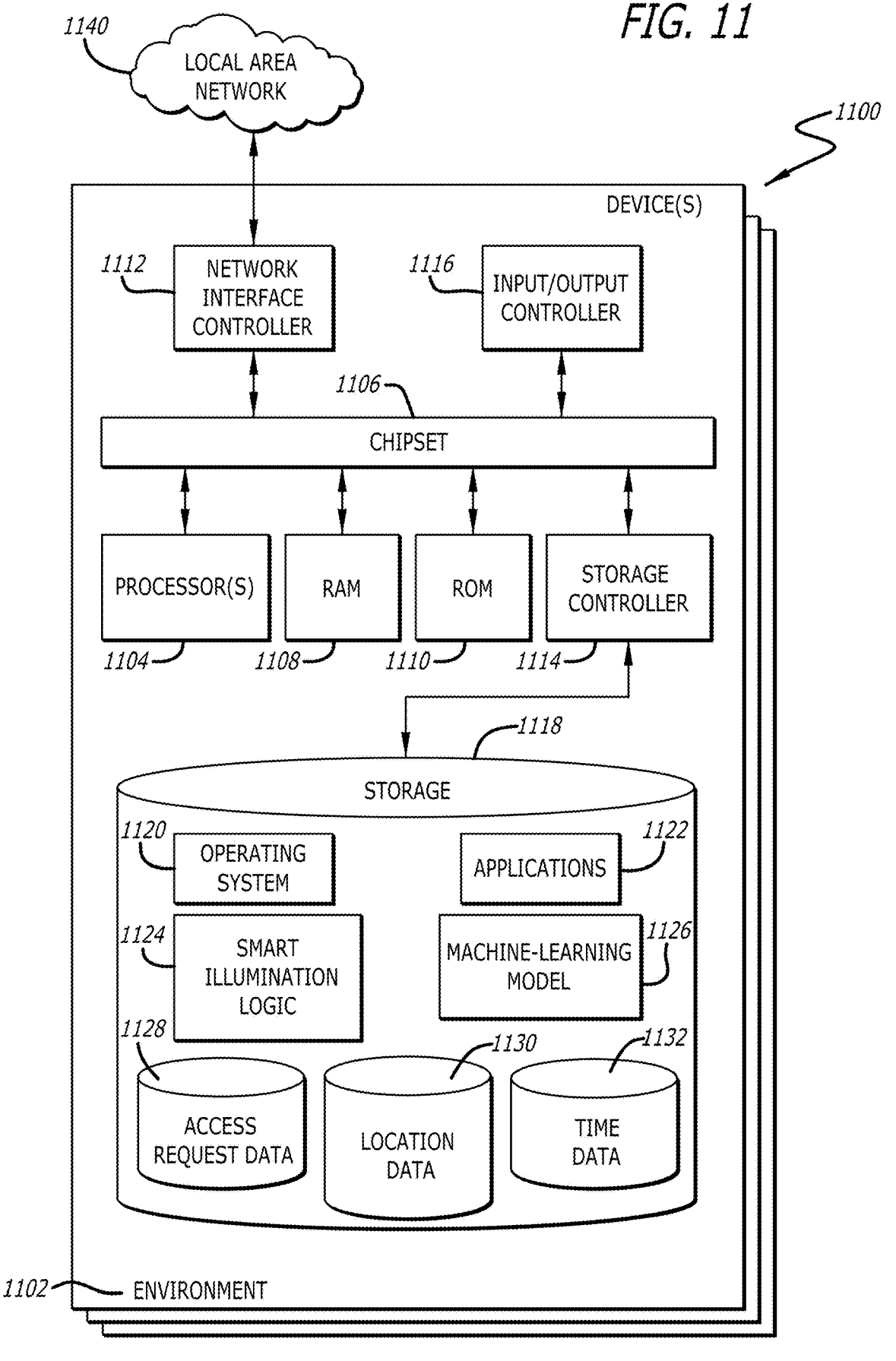
FIG. 11 is a conceptual block diagram of a device suitable for configuration with a smart illumination logic in accordance with various embodiments of the disclosure.

Referring to FIG. 11, a conceptual block diagram of a device 1100 suitable for configuration with a smart illumination logic in accordance with various embodiments of the disclosure is shown. The embodiment of the conceptual block diagram depicted in FIG. 11 can illustrate a conventional server computer, workstation, desktop computer, laptop, tablet, network device, access point, router, switch, e-reader, smart phone, centralized management service, or other computing device, and can be utilized to execute any of the application and/or logic components presented herein. The device 1100 may, in some examples, correspond to physical devices and/or to virtual resources and embodiments described herein.

In many embodiments, the device 1100 may include an environment 1102 such as a baseboard or "motherboard," in physical embodiments that can be configured as a printed circuit board with a multitude of components or devices connected by way of a system bus or other electrical communication paths. Conceptually, in virtualized embodiments, the environment 1102 may be a virtual environment that encompasses and executes the remaining components and resources of the device 1100. In more embodiments, one or more processors 1104, such as, but not limited to, central processing units ("CPUs") can be configured to operate in conjunction with a chipset 1106. The processor(s) 1104 can be standard programmable CPUs that perform arithmetic and logical operations necessary for the operation of the device 1100.

In additional embodiments, the processor(s) 1104 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In certain embodiments, the chipset 1106 may provide an interface between the processor(s) 1104 and the remainder of the components and devices within the environment 1102. The chipset 1106 can provide an interface to communicatively couple a random-access memory ("RAM") 1108, which can be used as the main memory in the device 1100 in some embodiments. The chipset 1106 can further be configured to provide an interface to a computer-readable storage medium such as a read-only memory ("ROM") 1110 or non-volatile RAM ("NVRAM") for storing basic routines that can help with various tasks such as, but not limited to, starting up the device 1100 and/or transferring information between the various components and devices. The ROM 1110 or NVRAM can also store other application components necessary for the operation of the device 1100 in accordance with various embodiments described herein.

Different embodiments of the device 1100 can be configured to operate in a networked environment using logical connections to remote computing devices and computer systems through a network, such as the network 1140. The chipset 1106 can include functionality for providing network connectivity through a network interface card ("NIC") 1112, which may comprise a gigabit Ethernet adapter or similar component. The NIC 1112 can be capable of connecting the device 1100 to other devices over the network 1140. It is contemplated that multiple NICs 1112 may be present in the device 1100, connecting the device to other types of networks and remote systems.

In further embodiments, the device 1100 can be connected to a storage 1118 that provides non-volatile storage for data accessible by the device 1100. The storage 1118 can, for example, store an operating system 1120, applications 1122, and data 1128, 1130, 1132, which are described in greater detail below. The storage 1118 can be connected to the environment 1102 through a storage controller 1114 connected to the chipset 1106. In certain embodiments, the storage 1118 can consist of one or more physical storage units. The storage controller 1114 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The device 1100 can store data within the storage 1118 by transforming the physical state of the physical storage units to reflect the information being stored. The specific transformation of physical state can depend on various factors. Examples of such factors can include, but are not limited to, the technology used to implement the physical storage units, whether the storage 1118 is characterized as primary or secondary storage, and the like.

For example, the device 1100 can store information within the storage 1118 by issuing instructions through the storage controller 1114 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 1100 can further read or access information from the storage 1118 by detecting the physical states or characteristics of one or more particular locations within the physical storage units.

In addition to the storage 1118 described above, the device 1100 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 1100. In some examples, the operations performed by a cloud computing network, and or any components included therein, may be supported by one or more devices similar to device 1100. Stated otherwise, some or all of the operations performed by the cloud computing network, and or any components included therein, may be performed by one or more devices 1100 operating in a cloud-based arrangement.

By way of example, and not limitation, computer-readable storage media can include volatile and non-volatile, removable, and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 1118 can store an operating system 1120 utilized to control the operation of the device 1100. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 1118 can store other system or application programs and data utilized by the device 1100.

In various embodiment, the storage 1118 or other computer-readable storage media is encoded with computer-executable instructions which, when loaded into the device 1100, may transform it from a general-purpose computing system into a special-purpose computer capable of implementing the embodiments described herein. These computer-executable instructions may be stored as application 1122 and transform the device 1100 by specifying how the processor(s) 1104 can transition between states, as described above. In some embodiments, the device 1100 has access to computer-readable storage media storing computer-executable instructions which, when executed by the device 1100, perform the various processes described above with regard to FIGS. 1-8. In more embodiments, the device 1100 can also include computer-readable storage media having instructions stored thereupon for performing any of the other computer-implemented operations described herein.

In still further embodiments, the device 1100 can also include one or more input/output controllers 1116 for receiving and processing input from a number of input devices, such as a keyboard, a mouse, a touchpad, a touch screen, an electronic stylus, or other type of input device. Similarly, an input/output controller 1116 can be configured to provide output to a display, such as a computer monitor, a flat panel display, a digital projector, a printer, or other type of output device. Those skilled in the art will recognize that the device 1100 might not include all of the components shown in FIG. 11 and can include other components that are not explicitly shown in FIG. 11 or might utilize an architecture completely different than that shown in FIG. 11.

As described above, the device 1100 may support a virtualization layer, such as one or more virtual resources executing on the device 1100. In some examples, the virtualization layer may be supported by a hypervisor that provides one or more virtual machines running on the device 1100 to perform functions described herein. The virtualization layer may generally support a virtual resource that performs at least a portion of the techniques described herein.

In many embodiments, the device 1100 can include a smart illumination logic 1124 that can be configured to perform one or more of the various steps, processes, operations, and/or other methods that are described above. While the embodiment shown in FIG. 11 depicts a logic focused on smart illumination, it is contemplated that a more general "access restriction" logic may be utilized as well or in lieu of such logic. Often, the smart illumination logic 1124 can be a set of instructions stored within a non-volatile memory that, when executed by the controller(s)/processor(s) 1104 can carry out these steps, etc. In some embodiments, the smart illumination logic 1124 may be an application that resides on a network-connected device, such as, but not limited to, a server, switch, personal or mobile computing device in a single or distributed arrangement. In certain embodiments, the smart illumination logic 1124 can be a dedicated hardware device or be configured into a system on a chip package (FPGA, ASIC and the like).

In a number of embodiments, the storage 1118 can include access request data 1128. As discussed above, the access request data 1128 can be collected in a variety of ways and may involve data related to multiple network and/or network devices. The access request data 1128 may be associated with a single server room, but may be associated with multiple requests for physical access to multiple areas. In additional embodiments, the access request data 1128 can include not only access request data, and time data but may also include details about the person seeking access, the expected length they will need access for, and/or the hardware configuration and/or capabilities of the network devices within the floorplan/deployment. This can allow for more reliable determinations based on a wider set of factors.

In various embodiments, the storage 1118 can include location data 1130. As described above, location data 1130 can be configured to include various items such as the specific target network device locations within a server room, the various entry points to the server room and their position relative to each other. The location data 1130 may, in certain embodiments, also comprise data related to any associated illumination devices that are proximate to various network devices and their various capabilities (lower-power mode, PoE, etc.). In many embodiments, the location data 1130 can be utilized for selecting which illumination devices are associated with various network devices. In some embodiments, the location data 1130 can be utilized to generate pathway data.

In still more embodiments, the storage 1118 can include time data 1132. As discussed above, time data 1132 can be utilized to indicate how long illumination devices should be engaged. In more embodiments, time data 1132 may be associated with a specific work order and be configured based on the expected length of that work order. Time data 1132 can be based on specific absolute time or can be a relative time that has a starting point at the time of access or the beginning of the work order.

Finally, in many embodiments, data may be processed into a format usable by a machine-learning model 1126 (e.g., feature vectors, etc.), and or other pre-processing techniques. The machine learning ("ML") model 1126 may be any type of ML model, such as supervised models, reinforcement models, and/or unsupervised models. The ML model 1126 may include one or more of linear regression models, logistic regression models, decision trees, Naïve Bayes models, neural networks, k-means cluster models, random forest models, and/or other types of ML models 1126. The ML model 1126 may be configured to learn the pattern of historical movement data of various network devices and generate predictions and/or confidence levels regarding current anomalous movements. In some embodiments, the ML model 1126 can be configured to determine which illumination devices to engage/disengage, and/or what pathway may be selected based on the given input data.

The ML model(s) 1126 can be configured to generate inferences to make predictions or draw conclusions from data. An inference can be considered the output of a process of applying a model to new data. This can occur by learning from at least the access request data, historical data, network device data, profile data, illumination device data, and/or the underlying algorithmic data and use that learning to predict future outcomes and needs. These predictions are based on patterns and relationships discovered within the data. To generate an inference, such as a determination of associated illumination devices, various suitable engagements/disengagements, pathways, position of tracked person, or specific illumination devices to engage, the trained model can take input data and produce a prediction or a decision/determination. The input data can be in various forms, such as images, audio, text, or numerical data, depending on the type of problem the model was trained to solve. The output of the model can also vary depending on the problem, and can be a single number, a probability distribution, a set of labels, a decision about an action to take, etc. Ground truth for the ML model(s) 1126 may be generated by human/administrator verifications or may compare predicted outcomes with actual outcomes. The training set of the ML model(s) 1126 can be provided by the manufacturer prior to deployment and can be based on previously verified data.

Although a specific embodiment for a device suitable for configuration with a network capacity prediction logic suitable for carrying out the various steps, processes, methods, and operations described herein is discussed with respect to FIG. 11, any of a variety of systems and/or processes may be utilized in accordance with embodiments of the disclosure. For example, the device may be in a virtual environment such as a cloud-based network administration suite, or it may be distributed across a variety of network devices or servers. The elements depicted in FIG. 11 may also be interchangeable with other elements of FIGS. 1-10 as required to realize a particularly desired embodiment.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each, and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device, comprising:
a processor;
at least one network interface controller configured to provide access to a network; and
a memory communicatively coupled to the processor, wherein the memory comprises a smart illumination logic that is configured to:
    determine a plurality of illumination devices within a data center, wherein the plurality of illumination devices allow for remote power configuration;
    disengage the power of one or more of the plurality of illumination devices;
    receive access request data;
    parse the access request data for location data, wherein the location data is associated with at least one target network device; and
    engage at least one illumination device associated with the at least one target network device.

2. The device of claim 1, wherein the at least one illumination device is an illumination device powered by the at least one target network device.

3. The device of claim 2, wherein the at least one illumination device is a light-emitting diode.

4. The device of claim 2, wherein the at least one illumination device is a liquid crystal display.

5. The device of claim 1, wherein the at least one illumination device is an illumination device in physical proximity to the at least one target network device.

6. The device of claim 5, wherein the at least one illumination device is an overhead light.

7. The device of claim 6, wherein the overhead light is configured to receive power over ethernet (POE).

8. The device of claim 1, wherein the smart illumination logic is further configured to:
    receive a work completed request; and
    submit a request to disengage the power of the at least one illumination device associated with the at least one target network device.

9. The device of claim 8, wherein the work completed request is received in response to a security device determining that no person remains in the data center.

10. The device of claim 1, wherein disengaging comprises responding to one or more application programming interface requests.

11. The device of claim 1, wherein the smart illumination logic is further configured to:
    parse the access request data for time data;
    determine a stop time based on the time data; and
    submit, in response to the stop time elapsing, a request to disengage the power of the at least one illumination device associated with the at least one target network device.

12. The device of claim 1, wherein the smart illumination logic is further configured to:
    generate a pathway between an access location and the at least one target network device;
    determine a plurality of illumination devices associated with the pathway; and
    submit a request to engage the power of the plurality of illumination devices.

13. The device of claim 1, wherein access request is received from an access control system.

14. The device of claim 13, wherein the access control system is configured to generate the access request in response to an access device being scanned.

15. The device of claim 14, wherein the access device is a radio frequency identification badge.

16. The device of claim 15, wherein the access device has an associated identification number.

17. A device, comprising:
a processor;
at least one network interface controller configured to provide access to a network; and
a memory communicatively coupled to the processor, wherein the memory comprises a smart illumination logic that is configured to:
    receive access request data associated with a data center room;
    parse the access request data for location data, wherein the location data is associated with at least one target network device within the data center room; and
    engage at least one illumination device associated with the at least one target network device.

18. The device of claim 17, wherein the smart illumination logic is further configured to:
    determine a plurality of illumination devices within a data center room, wherein the plurality of illumination devices allow for remote power configuration; and
    disengage the power of one or more of the plurality of illumination devices prior to receiving access data.

19. The device of claim 18, wherein the access request data is associated with a work order for one or more network devices within a server room.

20. A method of reducing data center power usage, comprising:
    determining a plurality of illumination devices within a data center, wherein the plurality of illumination devices allow for remote power configuration;
    disengaging the power of the plurality of illumination devices;
    receiving access request data;
    parsing the access request data for location data, wherein the location data is associated with a target network device; and
    engage the illumination devices associated with the target network device.

* * * * *